Figures 1, 2:
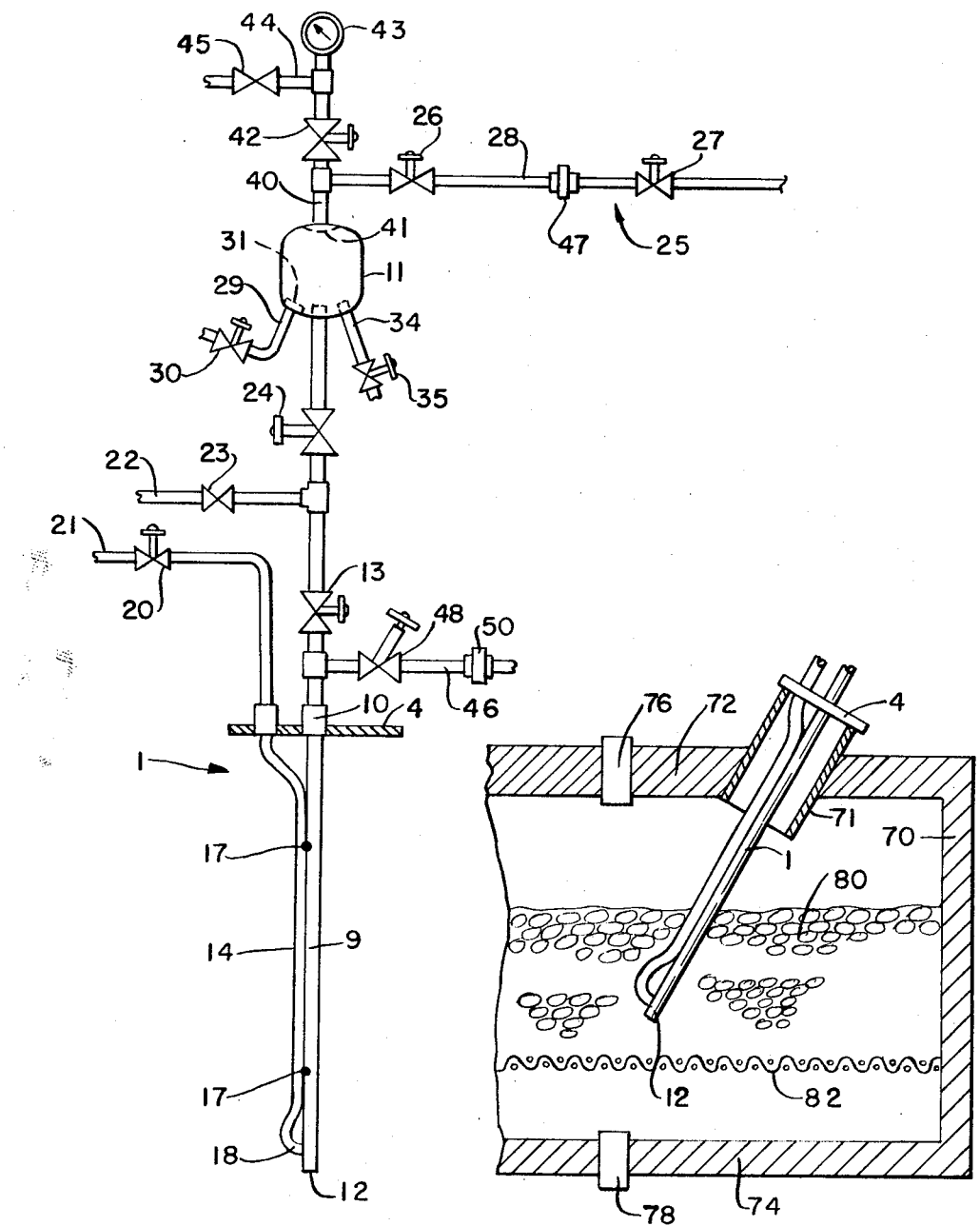

United States Patent

Vallino et al.

[15] 3,653,265

[45] Apr. 4, 1972

[54] CATALYST SAMPLING APPARATUS

[72] Inventors: Barney Vallino, Homewood; Thomas G. Merchant, Chicago, both of Ill.

[73] Assignee: Atlantic Richfield Company

[22] Filed: Sept. 11, 1970

[21] Appl. No.: 71,438

[52] U.S. Cl. ............................................. 73/421 B
[51] Int. Cl. ............................................. G01n 1/10
[58] Field of Search ........................... 73/421 B, 422

[56] References Cited

UNITED STATES PATENTS

| | | | |
|---|---|---|---|
| 3,319,469 | 5/1967 | Hartung | 73/421 B |
| 3,487,695 | 1/1970 | Haunschild | 73/421 B |
| 3,550,451 | 12/1970 | Fenske | 73/422 R |

Primary Examiner—S. Clement Swisher
Attorney—Morton, Bernard, Brown, Roberts & Sutherland

[57] ABSTRACT

An apparatus for a method of withdrawing samples of particulate solids, e.g., catalysts, from a bed of particulate solid material located in a vessel under super-atmospheric pressure. Differential pressure between the vessel and a solids receiver carries the sample from a bed of the solids in the vessel through a tubular sampler and into the receiver where the sample is purged and cooled, after which it it transferred to a container for storage until examination or analysis. An elongated tubular purging means communicating with the tubular sampler is used to inject a gas, e.g., nitrogen, into the tubular sampler. This action serves to regulate the amount of material withdrawn from the bed. It also serves to purge the tubular sampler of fluid and solid material and the receiver of vapors after sampling is completed. The apparatus is especially adapted for installation into existing commercial reaction vessels and allows catalyst sampling to be effected while a reaction vessel is in operation. Recycle gas, hydrogen gas or an inert gas can be introduced into the tubular sampler to minimize coking therein while the sampling apparatus is not in operation.

8 Claims, 2 Drawing Figures

INVENTORS
BARNEY VALLINO &
THOMAS G. MERCHANT

BY McLean, Morton + Boustead
ATTORNEYS

CATALYST SAMPLING APPARATUS

This invention is directed to an apparatus for and a method of withdrawing solid samples from a solid, fixed bed of particulate material situated in a pressurized vessel, for instance, catalyst from a chemical reaction vessel while in operation.

During various hydrocarbon conversions, naphtha reforming for example, metallic contaminants, carbonaceous materials from the hydrocarbon feedstock and extraneous materials such as sulphur, nitrogen and oxygen, are deposited on the catalyst disposed in a bed in the reaction zone. The accumulation of these materials on the catalyst particles tends to plug the bed, and thereby to reduce the catalytic activity and diminish the speed and effectiveness of the conversion process. Because catalyst particles are affected in this way, it is important, especially in closed systems, to know the extent of catalyst contamination so that the catalyst's regenerative ability, effectiveness and possible operating life can be determined. The sampling apparatus and method of the present invention permits the obtaining of such information. The apparatus is designed for incorporation into already existing reaction units. Such incorporation has heretofore been difficult and expensive because it involved inserting samplers at or near the bottom of the reactor for sampling in a downward direction. Incorporating the apparatus in such manner usually involves cutting the reactor wall and interior insulation, stress relieving the reactor, inserting a valve into the reactor and welding and sealing the sampler to the reaction vessel.

The apparatus of the present invention is advantageous in that it can easily, practically, effectively and inexpensively be incorporated into existing reaction units to withdraw samples of solids from a reaction vessel in an upward direction, utilizing, for example, a thermowell flange aperture already provided on the top of most existing reactors. A sampler in accordance with the present invention can be inserted into this aperture, and no internal valves are necessary. Parts utilized in the sampler need not be specially made, as they are essentially of standard manufacture. The apparatus of the present invention is also advantageous because it allows withdrawal of catalyst samples in an upward direction while preventing or effectively removing any plugging which might occur in a sampling line.

This invention involves an apparatus for and method of withdrawing a sample of particulate solids from a fixed bed of such solid material disposed in a pressurized vessel. The device includes a sample receiver located exterior of the vessel containing the bed of solids and a tubular sampler extending from the sample receiver through the wall of the vessel into the bed of particulate solid material. The tubular sampler includes an inlet for withdrawing a sample of the particulate solid material from the bed in the vessel into the sample receiver. The device further includes an elongated tubular purging means communicating with the sampler between its inlet and a valve which controls flow of fluid and solids into the sample receiver, means for supplying gas to the elongated tubular purging means for purging fluid and solids from the sampler and for regulating the amount of process gas and, therefore, of sample material removed from the vessel, and means for introducing gas to the sample flow means for minimizing coking that might otherwise occur in the sampler when the sampling apparatus is idle. The apparatus also preferably includes means for supplying gas to the sample receiver to equalize the pressure between the sample receiver and the pressurized vessel housing the bed of solids, to aid in the removal of liquid and gas from the sample receiver, and to purge the receiver and the means for removing liquid and gas from the catalyst sample receiver. At least one valve is provided on the sampler between the vessel and the sample receiver for controlling flow of fluid and solids from the vessel, through the sampler, and into the sampling receiver. Also included are means for removing vapor, often containing liquid and gas, from the sample receiver, means for regulating the rate of gas flow from the vessel having the solids bed through the sampler and through the sample receiver, and means for removing particulate solids samples from the sample receiver.

A preferred version of the apparatus includes means for screening solid material from vapor removed from the sample receiver.

The apparatus and method of this invention utilizes an inert gas, or the process gas itself, and differential pressure within a sampler between one end immersed in the bed of solids from which the sample is to be taken and the second end communicating with the sample receiver, to withdraw a sample of solids from the bed and to carry it upward through the sampler and into the sample receiver where the sample is purged, cooled and removed, or removed and cooled, and then transferred into a sample container for storage.

These and other aspects and advantages of the present invention are more apparent in the following detailed description and claims, particularly when considered in conjunction with the accompanying drawing in which:

FIG. 1 is a schematic elevational diagram of a preferred embodiment of apparatus in accordance with the present invention for withdrawing a sample of catalyst material from a fixed bed of particulate solid catalyst material disposed in a reaction vessel under elevated pressure; and FIG. 2 is a fragmentary schematic representation of the apparatus of FIG. 1 installed in a fixed bed reactor.

The sample withdrawing apparatus of the present invention, depicted generally at 1 in FIG. 1, includes tubular sampling means or sampler 9 and receiving means or receiver 11.

Preferably, sampler 9 has a diameter at least approximately 0.1 inch greater than the maximum sample particle length and five to 10 times greater than the sample particle diameter. Catalyst receiver 11 is preferably in the order of approximately eight to 55 times larger than the diameter of the sampler 9 to allow catalyst particles to separate from the carrier gas and settle at the bottom of the receiver. Tubular sampling means 9 includes inlet 12 for withdrawing a sample of particulate catalytic material. Sampler 9 passes through upper flange 4 of apparatus 1 by means of fitting 10. More than one inlet such as inlet 12 may be provided on sampler 9, if desired.

Located on tubular sampling means 9 are vessel outlet valve 13 and receiver inlet valve 24 which, when open, allow removal of fluid and samples of catalytic material from the catalyst bed through tubular sampling means 9 to catalyst sample receiving means 11 where the catalyst sample and fluid are deposited for collection.

Elongated tubular purging means or purging line 14, extends down through upper flange 4 of apparatus 1. The lower end of purging means 14 communicates with sample line 9 at junction 18, just above inlet 12. Purging line 14 can be sealed welded to sampler 9 at junction 18. Alternatively, purging means 14 and sample line 9 can be joined by means of any suitable joint, such as a tee joint. Purging line 14 and sampler 9 intersect at any angle, but preferably the upper angle formed by sampler 9 and purge line 14 is 90° or less. The point at which they join may be anywhere from inlet 12 adjacent the end of tubular sampling means 9 to the underside of flange 4. A convenient and suggested point of communication is close to inlet 12, approximately 1 to 2 inches above the inlet end of the catalyst sampling line 9, since it is desirable to purge as much as possible of the length of tubular catalyst sampling line 9 after removal of a sample. If desired, purging line 14 can be tack welded to sampler 9 at points 17, as depicted in the drawing. Preferably purge line 14 has an inside diameter substantially equal to or greater than the inside diameter of sampler 9, and a purge line 14 having an internal diameter less than about 6 percent of that of sampler 9 should not be used since such a purge line would not be capable of supplying sufficient purging gas to sampler 9.

Located on purging line 14 above flange 4 is purge valve 20 through which can be supplied purging gas from a suitable source to purge line 14. The gas used to purge the catalyst sampling line can be an inert gas supplied through line 21 from, for example, a source of inert gas such as nitrogen.

Upper sampler purge line 22, connected at one end to an inert gas source such as a nitrogen gas regulator (not shown), communicates via valve 23 with catalyst sampling line 9 between vessel outlet valve 13 and receiver inlet valve 24 and supplies gas to sampler 9 to help clear catalyst particles from vital surfaces of valve 24 and to clear the upper portion of sampler 9 of vapors and catalyst particles. Gas introduced through sampler purge line 22 by means of valve 23 also serves to raise the pressure within receiver 11. In addition, this gas purges the upper portion of catalyst sampling line 9, receiver 11 and the carrier gas system generally designated 25, the gas being vented through valve 26 orifice 47 and valve 27 on line 28. Orifice 47 has an opening in the order of one-thirty-second of an inch.

Receiver purge line 29, connected via valve 30 to an inert gas source (not shown), communicates with the bottom of catalyst receiver 11 to supply an inert gas to catalyst receiver 11 to cool and purge samples deposited therein and to purge the carrier gas system 25. The gas used to purge catalyst sample receiver 11 and carrier gas system 25 preferably is nitrogen but can be any other inert gas. Mesh screen 31 covers the outlet of purge line 29 within receiver 11 and is tack welded to the inner bottom of receiver 11 to prevent catalyst samples from entering purge line 29. Also communicating with the bottom of receiver 11 is sample removing line 34. When valve 35, located on line 34, is open, samples can be removed from receiver 11 through removing line 34 to a collection container.

Carrier gas line 40 communicates with sample receiver 11. Mesh screen 41 is tack-welded to the interior wall of receiver 11 to prevent sizeable samples in the receiver from entering line 40 and the carrier gas system. In addition to communicating with line 28, line 40 is provided with block valve 42 which when opened allows gas pressure from receiver 11 to register on receiver pressure gauge 43 and to pass to vapor removal line 44, which is controlled by valve 45. Line 28 of carrier gas system 25 is coupled by valve 26 to line 40 and is connected to orifice 47. Gas in line 28 then passes through valve 27 and leaves the system.

Carrier gas line 28 can be provided with other means for dealing with vapors removed from receiver 11. Such means can, for example, include a screening device located on line 28 near receiver 11 for preventing particulate catalyst samples from migrating farther into line 28, a carrier gas cooler for cooling the carrier gas and condensing vapors from the carrier gas, a liquid knock out pot for disengaging and collecting the condensate from the carrier gas line, and a gas flow control system consisting of various valves and a flow meter for controlling the flow of carrier gas through sampler 9, receiver 11 and line 28. If a screening device is employed, it should be situated between catalyst sample receiver 11 and gas flow control valve 26 and it should be of proper size to stop any catalyst particles from migrating into the gas line without significantly restricting gas flow. Valves communicating with the carrier gas cooler can be provided to control the amount of fluid such as water, used to cool the gas by indirect heat exchange. The knock out pot can have a valve communicating with it to allow for the removal of the liquid collected in the pot and for the venting of catalyst receiver 11.

Communicating with tubular sampling line 9 at a point between fitting 10 and reactor outlet valve 13 is idle recycle gas line 40, which permits introduction of a stable gas such as recycle gas, hydrogen gas or an inert gas into tubular sampling line 9 to prevent particulate solids from entering and forming coke in sampler 9 when the sampling apparatus is not in operation. By "stable gas" in this specification and in the following claims is meant a gas which will not react with the gas within the reaction vessel from which the sample withdrawal apparatus is to withdraw solid particulate samples. Recycle gas valve 48 on recycle gas line 46, when open, permits gas to flow from, for example, a recycle gas compressor (not shown) through orifice 50 in gas line 46 into sampler line 9. Orifice 50, for example, can be a one-sixteenth inch orifice.

FIG. 2 depicts a manner of locating sample withdrawal apparatus 1 within a vessel 70 to withdraw catalyst samples therefrom. Vessel 70 includes end walls 72 and 74 with openings 76 and 78 for inlet and outlet during downflow operation. Alternatively, upflow operation can be effected with inlet through opening 78 and outlet through opening 76. A fixed bed 80 of particulate solid material is supported on screen 82 within vessel 70 so that fluid can flow therethrough during operation. Apparatus 1 is inserted into vessel 70 through, for example, a thermowell nozzle which conveniently may have an insertion flange 71 that mates with flange 4 of apparatus 1. Preferably, apparatus 1 is positioned in vessel 70 so that inlet 12 is near the center of bed 80.

In the quiescent condition with vessel 70 in operation but with the sample withdrawal apparatus 1 not in operation, valves 42 and 48 are open, and all other valves are closed. In this condition recycle gas from line 47 ensures that catalyst from bed 80 does not enter sampler 9 to clog the sampler. In addition, the pressure within receiver 11 is indicated on gauge 43.

To prepare for withdrawing a sample from vessel 70, receiver 11 is purged and is brought to the appropriate pressure. First valve 24 is opened. Then valve 23 is opened to introduce nitrogen into receiver 11 so that the pressure within the receiver builds to approximately 400 p.s.i.g. Valve 23 is then closed and valve 35 is slowly opened to depressurize receiver 11 to about 5 p.s.i.g. valve 35 is then closed. The operation of valves 23 and 35 to pressurize and depressurize receiver 11 is repeated about two more times to purge the upper portion of sampler 9. In addition, during this pressure cycling, gauge 43 is monitored to ensure that there are no leaks within receiver 11 and the accompanying components. Once the purging is completed, valve 23 is opened to pressurize receiver 11 to about 450 p.s.i.g. Valve 23 is then closed, valve 26 is opened, and valve 48 is closed.

To lift a sample of catalyst up from vessel 70, valve 13 is opened, thereby causing the pressure in receiver 11 and the pressure in vessel 70 to equalize. Valve 27 is then opened. This reduces the pressure within receiver 11 with the result that catalyst from vessel 70 moves up through sampler 9 to receiver 11. After a period of time sufficient to permit the desired size of catalyst sample to be brought into receiver 11, e.g., 2 minutes, valve 20 is opened, introducing nitrogen to the inlet end of sampler 9. This nitrogen is sufficient to satisfy the flow requirement resulting from the pressure differential between receiver 11 and vessel 70, and so catalyst from bed 80 no longer enters sampler 9. Once this nitrogen has been introduced for sufficient time to purge the entire length of sampler 9, e.g., 30 seconds, valves 13 and 20 are closed. Valve 23 is then opened to purge receiver 11 through line 28 for about 60 seconds. Valves 24 and 23 are then closed. Valves 26 and 27 are likewise closed, and valve 45 is opened to depressurize receiver 11. Valve 30 is then cracked to gently purge receiver 11 through line 44 for approximately 60 seconds. Valves 30 and 45 are then closed with receiver 11 at about 5 p.s.i.g.

The catalyst sample can be withdrawn from receiver 11. Gauge 43 should be observed to ensure that all valves are holding. Valve 35 is then opened, and valve 30 is slightly cracked so that nitrogen passing through valve 30 causes the sample to leave receiver 11 through sample removing line 34. The pressure should be carefully monitored on gauge 43 during this time. The sides of receiver 11 may be pounded to loosen catalyst therefrom. Once the sample has been withdrawn, valves 30 and 35 are closed. If desired to ensure that the sample obtained is from the active portion of bed 7 and not from catalyst hanging within sampler 9, the sample drawing and removal procedure can be repeated. The apparatus is then returned to its quiescent condition by closing all valves except valves 48 and 42. Using the apparatus and method herein disclosed, it has been found that a 4-ounce sample of platinum-alumina reforming catalyst of approximately 0.3 to 0.6 weight percent platinum on an alumina base, and of cylindrical shape, usually one-sixteenth inch in diameter and one-eighth inch to approximately three-eighths inch in length, can readily and conveniently be withdrawn through a ½ inch, sample line for a vertical distance of at least 11 feet to 16 feet in 30 to 60 seconds. The results are repeatable if the carrier gas is controlled during sampling. Plugging of the catalyst sampling line was found to be easily avoided by using the hereinbefore described sampling and purging procedure.

What is claimed is:

1. Apparatus for withdrawing a sample of solid particulate material from a pressurized vessel housing a bed of such material, said apparatus comprising:
   a. a sample receiver having a first inlet and first and second outlets;
   b. sampling conduit means extending through a wall of said vessel, said sampling conduit means having
      i. an inlet within said vessel for withdrawing particulate solid material from the bed thereof into said sample receiver;
      ii. a first valve outside of said vessel; and
      iii. an outlet connected to said sample receiver first inlet;
   c. a first valved and pressurized inert gas source for introducing an inert gas to said sample receiver;
   d. valved outlet means at a pressure below the pressure within said pressurized vessel and connected to said sample receiver first outlet for controlling removal of fluid from said sample receiver;
   e. controlled sample removal means connected to said sample receiver second outlet for removing solid particulate material samples therefrom;
   f. a second inert gas source for introducing an inert gas to said sampling conduit means at a point adjacent said sampling conduit means inlet to purge said sampling conduit means; and
   g. a stable gas source under pressure and connected to said sampling conduit means outside said vessel and at a point intermediate said first valve and said sampling conduit means inlet for introducing a stable gas to said sampling conduit means.

2. Apparatus as claimed in claim 1 in which said stable gas source is a controlled gas conduit connected to a source of inert gas.

3. Apparatus as claimed in claim 1 in which said stable gas source is a controlled gas conduit connected to a source of recycle gas.

4. Apparatus as claimed in claim 1 in which said sample receiver includes a second inlet and in which said apparatus further comprises a further inert gas source connected to said sample receiver second inlet to introduce inert gas thereto.

5. Apparatus as claimed in claim 1 in which said solid particulate material is a catalyst.

6. A method of withdrawing a sample of solid particulate material from a pressurized vessel housing a bed of such material, through a valved sampling conduit extending into the bed, and into a sample receiver connected to the sampling conduit and having a fluid outlet and a sample outlet, said method comprising:
   a. opening the valve in the sampling conduit to equalize the pressure in the vessel and in the sample receiver;
   b. opening the sample receiver fluid outlet to a zone at a pressure below the pressure within the vessel to cause a sample of the solid particulate material to traverse the sampling conduit to the sample receiver;
   c. introducing an inert gas to the sampling conduit to halt the flow of solid particulate material thereinto and to purge the sampling conduit;
   d. closing the valve in the sampling conduit to halt flow therethrough;
   e. removing the sample of solid particulate material from the sample receiver; and
   f. introducing a stable gas to the sampling conduit to block entry of solid particulate material thereinto.

7. A method as claimed in claim 6 further comprising the step of initially pressurizing and depressurizing the sample receiver with an inert gas to purge the sample receiver.

8. A method as claimed in claim 6 in which removing of the sample is achieved by opening a sample removal outlet in the sample receiver, and introducing an inert gas into the sample receiver at a pressure above atmospheric to force the sample of solid particulate material from the receiver through the sample removal outlet.

* * * * *